Inventor
Alfred D. Sinden.
By Manns and Brown
Attys.

Inventor
Alfred D. Sinden

Patented Feb. 28, 1950

2,499,171

UNITED STATES PATENT OFFICE 2,499,171

APPARATUS FOR CONVEYING LOOSE MATERIALS

Alfred D. Sinden, Aurora, Ill., assignor to Stephens-Adamson Mfg. Co., a corporation of Illinois Application December 20, 1947, Serial No. 792,936

3 Claims. (Cl. 198—220)

The principal object of this invention is to convey loose, discrete material in a substantially continuous, wavy stream along a trough or table with little power.

Generally speaking, this is accomplished by suspending the trough or table to swing from overhead axes, and oscillating it back and forth at a speed that will project material upwardly and forwardly from it on the forward stroke, and will return the trough or table and bring it downwardly and forwardly substantially coincident with the forward and downward movement of the material projected from it on the next preceding forward stroke.

The preferred embodiment of the invention is shown in the accompanying drawings, in which—

Figure 3:
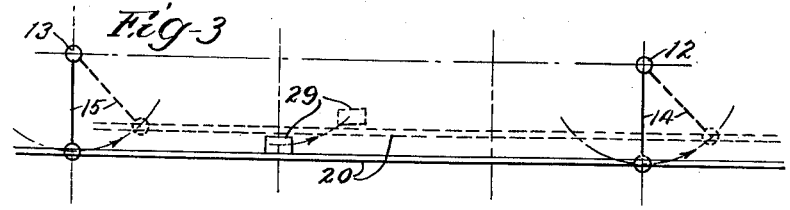
Figure 4:
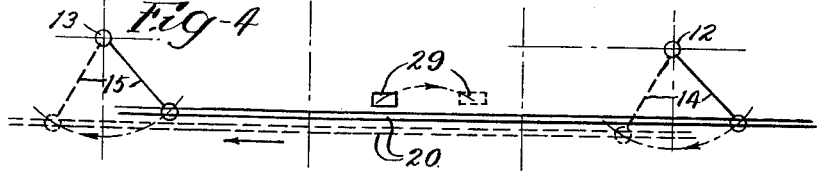
Figure 5:
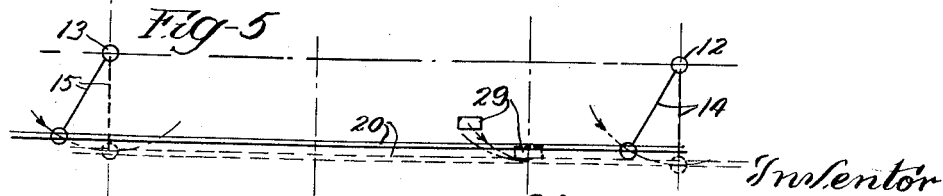

Figs. 3, 4, and 5 are diagrams of the motion of the apparatus; and

Figure 6:
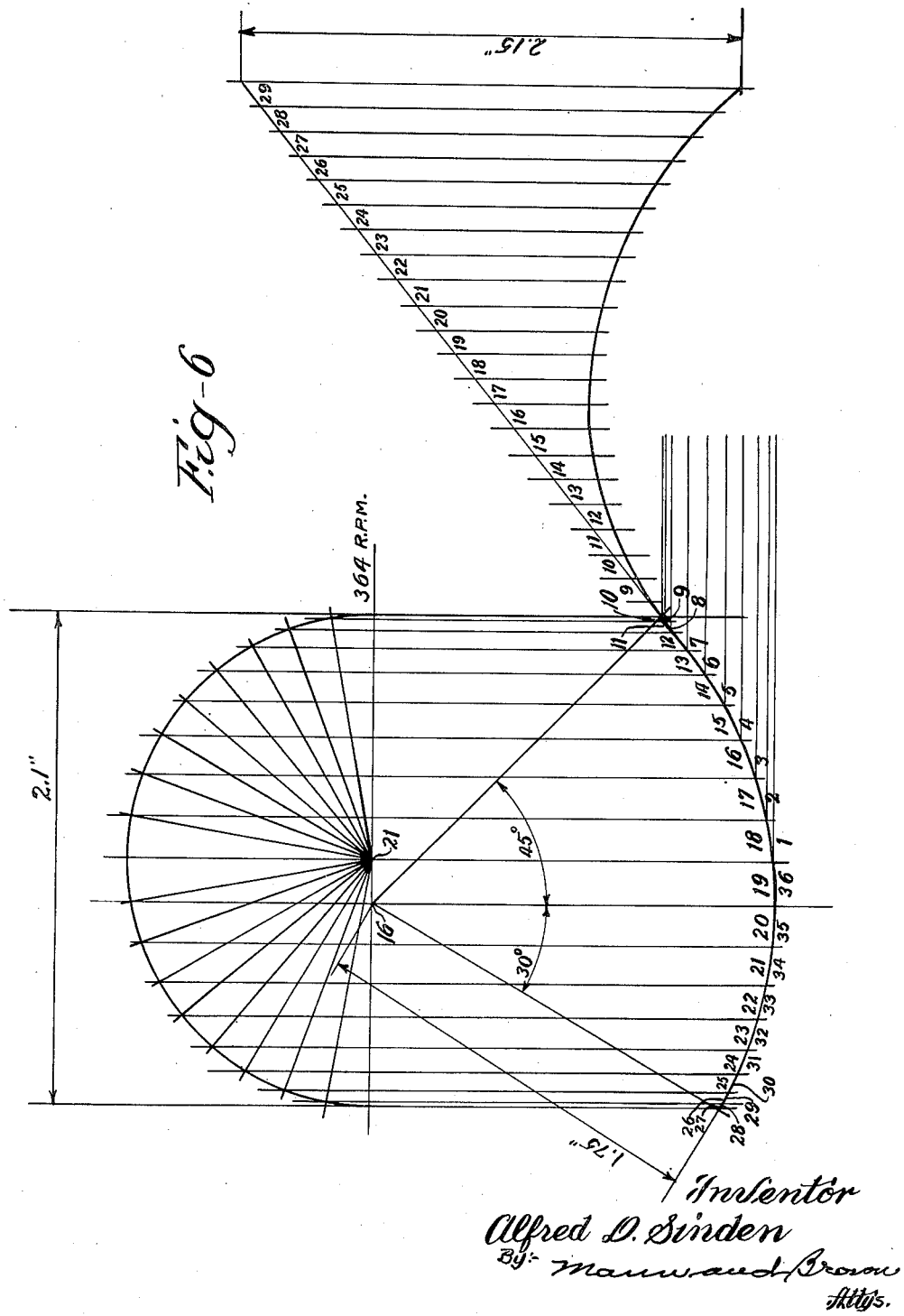
Figure 7:
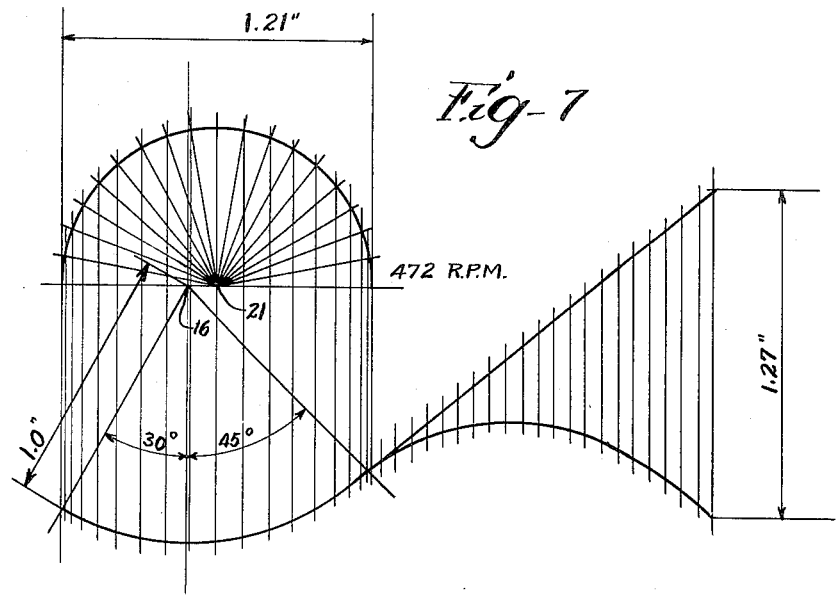
Figure 8:
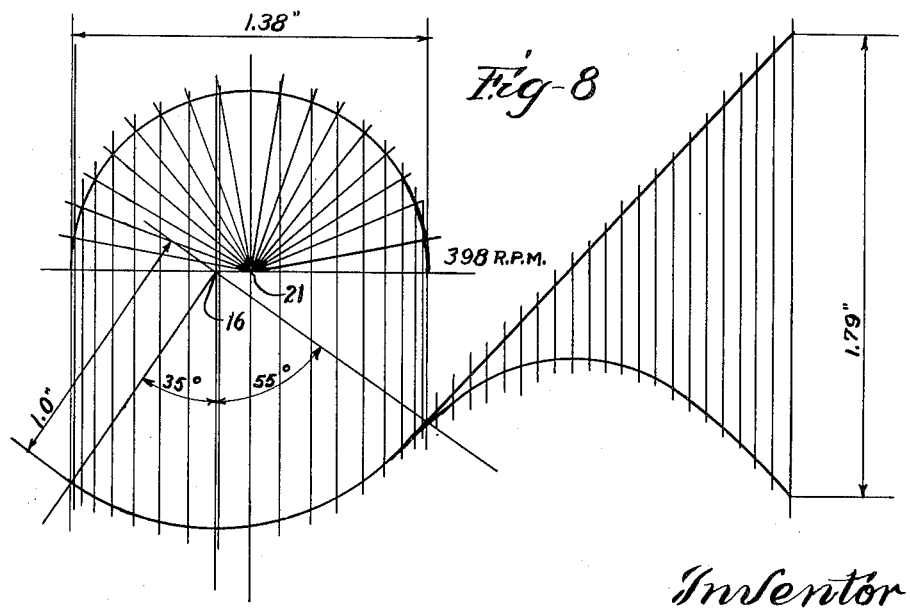

Figs. 6, 7, and 8 are diagrams of the motion in successive intervals of 1/36 of a revolution of the driving eccentric.

Figure 1:
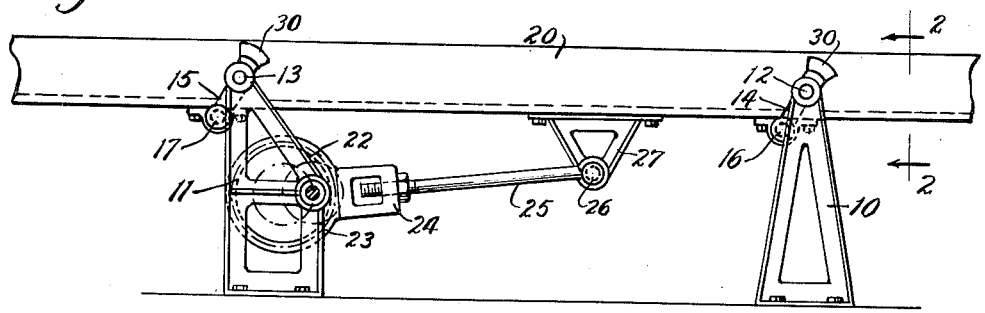
Fig. 1 is a diagrammatic side elevation of the trough or table and its driving means.
Figure 2:
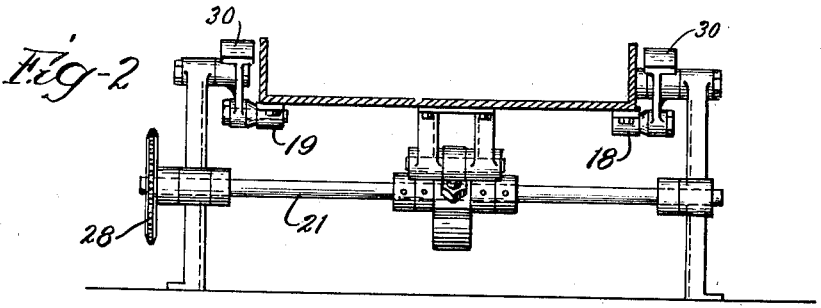
Fig. 2 is a section on the line 2—2 of Fig. 1.

In the diagrams Figs. 1 and 2, the supporting brackets 10 and 11 are equipped with upper shafts 12 and 13, which support links 14 and 15, and they, in turn, support shafts 16 and 17 equipped with brackets 18 and 19 secured to the trough or table in any suitable manner. From this, it will be clear that the trough or table 20 is mounted to swing back and forth through any desired amplitude.

The trough is oscillated by a driven shaft 21 having an eccentric 22 cooperating with an eccentric strap 23 adjustably connected at 24 with a connecting rod 25 pivoted at 26 to a bracket 27 secured to the trough or table between the supporting shafts 16 and 17.

Assuming the shaft 21 to be driven in any suitable manner through sprocket 28, or otherwise, the motion of the trough or table and a particle 29 is illustrated diagrammatically in Figs. 3, 4, and 5. In Fig. 3, the solid lines show the position of the table and the particle 29 when the supporting links 14 and 15 are in the vertical position, and in dotted lines they are shown in the position they assume as the table approaches 45 degrees forward stroke.

In Fig. 4, the solid lines show the parts in the position they assume at the end of a 45 degree forward stroke, and the dotted lines show the parts in the position they assume as the links 14 and 15 reach 30 degrees rearward of the vertical.

Fig. 5 shows the position of the parts when the links 14 and 15 have returned to the position 30 degrees back of the vertical, and the dotted lines show the position the parts assume when the links return to vertical.

From these diagrams, it will be apparent that the material and the table move together during most of the forward stroke. Near the end of that stroke, the trough is slowing down due to the peculiarities of the eccentric while the material continues by its momentum, leaving the trough and following its normal trajectory. During the free flight of the material, the trough comes to rest in its forward motion, returns, and again starts forward. By this time, the material is in the downward portion of its trajectory, and overtakes the trough at a point where both material and trough are travelling in about the same direction at nearly the same speed, whereupon the cycle is repeated. There is little impact as the material and trough come together, and there is practically no sliding friction to cause loss of power.

Fig. 6 is a diagrammatic scale lay-out of the motion, and represents a compromise between extremes of speed and amplitude of motion.

The effective length of the supporting links 14 and 15 is shown as 1¾ inches. The swing is 45 degrees forward and 30 degrees backward of the vertical, and the speed is 364 cycles per minute with a radius of eccentric or crank of 1.05 inches.

The half circle at the top of the diagram, having a diameter of 2.10 inches, represents one-half revolution of the eccentric. The complete revolution is divided into 36 equal intervals of 10 degrees each, numbered consecutively from 1 to 36, starting at the bottom. Points on the circle being projected to the arc, which represents motion of the conveyor trough, locate points in the trough motion at every 1/36 revolution. These are numbered to correspond with the intervals in the motion of the eccentric. The time for each interval is:

$$\frac{60}{364} \times \frac{1}{36} = .00458 \text{ sec.}$$

Horizontal lines are drawn through the points on the arc, and the vertical distance between lines represents the vertical component of the trough movement during each interval. It will be seen that the vertical components, starting with interval number 1, are increasing in amount, up to interval number 6. The vertical component in interval number 7 shows a decrease, and this trend continues up to the reversal of motion at the end of interval number 9.

Up to the end of interval 6, material resting on the trough is forced to move with the trough, but when the rate of movement starts to decrease, as in interval 7, the momentum of the material causes it to leave the trough and travel in a trajectory under the action of its inertia and gravity. Due to the inertia of a particle of material, it tends to continue in the direction and at the speed which is obtained during interval 6, but at the same time it drops at an accelerating rate the same as any falling body.

In Fig. 6, a tangent to the arc at the end of interval 6 is drawn upward, and lengths equal to interval 6 are marked off along it, and numbered to correspond with the succeeding intervals. The end of each space is then the point which the particle of material, except for the action of gravity, would have reached at the end of the designated interval. Vertical lines are drawn through each point on the slope and a length is laid off downward equal to the distance the particle would fall in the time elapsed after the end of interval 6.

For instance, at the end of interval 7 the elapsed time is .00458 second. Using the equation for falling bodies, $S = \frac{1}{2}g \times t^2$ where $S$ = distance in feet, $g$ = acceleration of gravity = 32.2 ft. per sec. per sec., and $t$ = time in seconds; the distance fallen in .00458 second is .000338 foot, or .00406 inch. The calculated distances of fall for subsequent intervals are given in the following table:

| End of Interval No. | Total Elapsed Time, Seconds | Distance of Fall, Inches |
|---|---|---|
| 7 | .00458 | .00405 |
| 8 | .00916 | .0162 |
| 9 | .01372 | .0363 |
| 10 | .0183 | .0645 |
| 11 | .0229 | .101 |
| 12 | .0274 | .145 |
| 13 | .032 | .197 |
| 14 | .0366 | .259 |
| 15 | .0412 | .328 |
| 16 | .0458 | .405 |
| 17 | .0504 | .49 |
| 18 | .055 | .583 |
| 19 | .0596 | .685 |
| 20 | .0641 | .791 |
| 21 | .0688 | .913 |
| 22 | .0733 | 1.04 |
| 23 | .0779 | 1.17 |
| 24 | .0825 | 1.31 |
| 25 | .087 | 1.46 |
| 26 | .0917 | 1.62 |
| 27 | .0962 | 1.78 |
| 28 | .1008 | 1.96 |
| 29 | .1054 | 2.15 |

The points determined by laying off the distances of fall are points on the trajectory of the particle during its free flight after leaving the trough at the end of interval 6. It will be seen that the top of the trajectory is reached at about the end of interval 17. Meanwhile the trough is making its return stroke, and is below the trajectory so that it does not interfere with the motion of the material. After the particle passes the top of its trajectory and starts to move downward, it begins to overtake the trough. However, it does not actually overtake the trough until the end of interval 29. It is seen from the diagram that, at approximately the end of interval 29, the direction and speed of the motion of the particle most nearly correspond to the direction and speed of the trough. For that reason, the speed of rotation of the eccentric is determined so as to achieve the condition shown in the diagram where the material overtakes the trough at about the end of interval 29.

To determine the speed of rotation for an assumed combination of radius of arc and angular movement each side of vertical, a diagram is constructed similar to that in Fig. 6, but without the distances of fall laid off, since these are not yet known. A horizontal line is drawn through the point on the arc making the end of interval 29. By measuring, the vertical distance is determined between the end of interval 29 on the arc, and the end of interval 29 on the sloping line. This is the distance of fall during the period of time from the end of interval 6 to the end of interval 29, or the time for $^{23}/_{36}$ of a revolution. The correct speed of rotation to produce the stated conditions may then be calculated.

For instance, in Fig. 6 the vertical distance between the ends of interval 29 on the arc and on the slope are measured as 2.15". Solving for $t$ in the equation for falling bodies:

$$\frac{2.15}{12} = \frac{1}{2} \times 32.2 \times t^2 \quad t^2 = 0.01113$$

$$t = .1056 \text{ sec.} = \text{time to fall } 2.15''$$

Time for one revolution of eccentric =
$$.1056 \times {}^{36}/_{23} = .165$$

$$\text{Revolutions per minute} = \frac{60}{.165} = 364$$

Figs. 7 and 8 are diagrams of the motion of trough and material for other combinations of arc radius and amplitude. In Fig. 7, the angular movement each side of vertical is the same as in Fig. 6, but the arc radius is shorter. The speed required for correct conveying action is thus considerably higher.

In Fig. 8, the arc radius is the same as in Fig. 7, but the angular movement each side of vertical is increased. The speed is lowered as compared to Fig. 7, while the path of the material is more tortuous and greater agitation in the stream of material would be expected.

The supporting links 14 and 15 are provided with counter weights 30 to balance the load on opposite sides of the shafts 12 and 13.

I claim:

1. In a device of the class described, a table, links suspending and guiding the table for oscillatory movement along an arcuate path, and means to oscillate the table back and forth a greater distance forward from the vertical position of the links and a lesser distance backward from the vertical position of the links whereby at a predetermined speed of operation the table will commence downward and forward movement at a time when that movement substantially coincides, in direction, with the trajectory of the material projected from the table on a previous forward and upward movement.

2. In a device of the class described, a generally horizontal swinging table, links suspending the table to swing about axes thereabove, and means to oscillate the table back and forth further forward from the vertical position of the links than backward from the said vertical whereby at a predetermined speed the table will swing to commence forward and downward movement from its rearmost position during the time of free flight of material projected from it on the previous forward and upward movement.

3. In apparatus for conveying material in a substantially continuous wavy stream, a conveyor table, links suspending the table to swing from axes thereabove, and means to oscillate the said table back and forth further forward from the vertical position of the links than its swing backward from the vertical position of the links at a speed that will bring the table downwardly and forwardly substantially coincident with the corresponding forward and downward movement of material projected from the table on the previous forward and upward swing and at a time when said material has fallen to a position substantially coincident with the surface of said table.

ALFRED D. SINDEN.

REFERENCES CITED

The following references are of record in the file of this patent:

UNITED STATES PATENTS

| Number | Name | Date |
|---|---|---|
| 757,477 | Marcus | Apr. 19, 1904 |
| 1,160,427 | Marcus | Nov. 16, 1915 |
| 1,447,507 | Becker | Mar. 6, 1923 |
| 2,374,663 | Carrier | May 1, 1945 |

FOREIGN PATENTS

| Number | Country | Date |
|---|---|---|
| 20,177 | Great Britain | Sept. 6, 1913 |
| 332,089 | Germany | Jan. 21, 1921 |